United States Patent [19]

Bollen et al.

[11] 4,029,631

[45] June 14, 1977

[54] POLYESTER SHEET CONTAINING ANTIBLOCK AGENT ADDED IN DEGRADABLE POLYCARBONATE

[75] Inventors: Philip Stuart Bollen, Auburn; Eugene Vincent Walacavage, Minersville, both of Pa.

[73] Assignee: Allied Chemical Corporation, Morris Township, N.J.

[22] Filed: Nov. 3, 1976

[21] Appl. No.: 738,784

[52] U.S. Cl. .......................... 260/40 R; 260/37 PC; 260/860; 264/171; 264/176 R; 264/216
[51] Int. Cl.[2] .................... C08G 63/62; C08K 3/36
[58] Field of Search ............. 260/40 R, 37 PC, 860; 264/171, 176 R, 216

[56] References Cited

UNITED STATES PATENTS

| | | | |
|---|---|---|---|
| 3,218,372 | 11/1965 | Okamura et al. | 260/860 |
| 3,426,100 | 2/1969 | McDonough | 260/860 |
| 3,720,732 | 3/1973 | Lenenick | 260/860 |
| 3,956,229 | 5/1976 | Bollen et al. | 260/40 R |
| 3,975,355 | 8/1976 | Bollen et al. | 260/40 R |
| 3,975,485 | 8/1976 | Bollen et al. | 264/171 |

*Primary Examiner*—Sandra M. Person
*Attorney, Agent, or Firm*—Richard A. Anderson

[57] ABSTRACT

A polyester sheet containing an antiblock agent is produced by uniformly blending a small amount of a degraded polycarbonate containing the antiblock agent. The antiblock agent must have an inherent or adjusted pH of less than six to degrade the polycarbonate to lower its molecular weight upon extrusion compounding. This in turn makes a uniform blend and resulting clear sheet with antiblocking properties. In another embodiment, larger amounts of polycarbonate containing the antiblock agent are used.

31 Claims, No Drawings

POLYESTER SHEET CONTAINING ANTIBLOCK AGENT ADDED IN DEGRADABLE POLYCARBONATE

BACKGROUND

1. Field of the Invention

This invention is related to transparent sheets formed from blends of polyethylene terephthalate and polycarbonate resins containing an antiblock agent, a process for their production, and containers formed therefrom.

2. Discussion of the Prior Art

Polyethylene terephthalate (hereinafter sometimes referred to as "PET") resins can be employed to prepare transparent film and sheet. Usually the resin is extruded into an amorphous flat sheet which is then biaxially stretched and thereafter heat set to impart a desired degree of crystallization to the sheet. Such biaxially oriented and crystallized products are strong and clear, but cannot readily be formed, such as by thermoforming, into containers since the process of biaxially stretching removes most of the extensibility of the sheet. If amorphous PET sheet is produced by rapid cooling of the molten sheet, a clear and transparent product may be obtained which is formable into containers. These containers may be used for lower temperature filling food packaging, at temperatures of from about 100° to 140° F. Blended with higher amounts of polycarbonate, the sheet can be formed and filled with foods at higher temperatures, for example, 150°—180° F.

Amorphous polyester sheet is also produced for meat and pharmaceutical packaging as well as warm and hot fill of syrups and other foods. These packages are often times formed with the well-known prior art process of thermoforming. This is where a blocking problem will often occur. In one case, preforms are stacked together then transported to another part of the plant where they are denested and filled with meat. Whereas no difficulties in separating the preforms ever occurred with the previously used polyvinyl chloride sheet, great difficulty was experienced in trying to separate the polyester preforms due to the sheet's tackiness. In another case, the lack of slip in the sheet caused cups of syrup to jerk on the filling machinery resulting in spillage. Because of these problems, it is necessary to produce a grade of polyester sheet with superior slip and block properties.

Probably the most commonly used additive for improving blocking properties is silica of one form or another, be it in polyolefins, PVC, or other plastic film. Usually, in the case of pellet feedstocks, such things as slip additives, colorants, and other additives are added in the form of pelletized concentrates of a masterbatch.

However, in the case of polyester, there are very few compounders with processing equipment which can handle the high temperatures required for PET, and, in particular the high intrinsic viscosity material (0.95). The use of extruders for compounding fine particulates, such as antiblock agents, into polyester does not work well if the polyester is in pellet form since not only do the two components settle out quickly in an extruder hopper, but the low melt viscosity of PET leads to a poorly dispersed concentrate. Some PET was ground to a fine powder which solved the settling out problem, but the dispersion in the concentrate after processing on a single screw two-inch extruder equipped with a mixing screw was still poor. Since PET is usually available only in pellet form, the additional pulverizing step creates an additional expense.

It is known in the prior art to add silica filler to one of the blended polymers, preferably the polycarbonate, as disclosed in U.S. Pat. No. 3,975,355, hereby incorporated by reference, which discloses a blend of PET with polycarbonate for making sheet to be further processed into thermoformed sheets. However, this prior art teaching is limited to nonacidic silica filler which means a pH of not less than about 6. In fact, in this earlier disclosure, because of higher concentrations it was thought that acidic silica was unsatisfactory.

In copending U.S. Ser. No. 729,739, filed Oct. 5,1976, hereby incorporated by reference, small amounts of polycarbonate resin are physically blended into polyethylene terephthalate prior to extrusion to reduce deposits on the cooling rolls.

In copending U.S. Ser. No. 625,299 filed Oct. 23, 1975, hereby incorporated by reference, a sheet intended for hot filled applications at 150°–180° F. or higher is uniformly blended from about 80 to about 95 percent PET and 20 to 5 percent polycarbonate is disclosed.

In U.S. Pat. Nos. 3,956,229 and 3,975,485, there is described film and sheet formed from blends of from 60 to 85 parts of PET having an intrinsic viscosity of at least about 0.9 and 40 to 15 parts of a polycarbonate resin. Such film or sheet may be thermoformed into cook-in trays and like articles. Although such film and sheet have requisite strength and toughness to be utilized for cook-in tray applications, such sheets have a very high degree of haziness and consequently would not be suitable for applications wherein a clear sheet is desired.

In U.S. Pat. No. 3,720,732, the disclosure is limited to a biaxially oriented PET film, and discusses adding small amounts of polycarbonate to the resin to improve heat stability and slip properties. The invention of this application is directed to nonoriented amorphous sheet.

It is also known that the properties of the lower intrinsic viscosity PET resins may be modified by the addition of polycarbonate, as is described in U.S. Pat. No. 3,218,372, which also discloses an increase in the hardness, strength and electric properties of the molding material disclosed.

Glass fiber reinforced, novaculite-filled composite sheet, formed from semicrystalline PET, is disclosed in U.S. Pat. No. 3,475,140, hereby incorporated by reference. This disclosure contains an excellent discussion of all of the various forms and phases of silica, and teaches away from the use of amorphous silica in PET.

SUMMARY OF THE INVENTION

In one aspect, this invention is a method of adding an antiblock agent to polyethylene terephthalate. The polyethylene terephthalate should have an intrinsic viscosity greater than 0.9, and a melt viscosity at 525° F. of above about 10,000 poises and is used to form a sheet. The method consists of (a) compounding, preferably extrusion compounding, from about 0.25 to 0.01 percent by weight based on the final total weight of all components of an antiblock agent with from about 2.5 to 0.1 percent by weight based on the final total weight of all components of a degradable polycarbonate. The antiblock agent should have a pH of less than 6. The polycarbonate should have an intrinsic viscosity of from about 0.55 to 0.7 before it is compounded. Intrinsic viscosity for the polycarbonate is measured in 0.4% dioxane at 30° C. Then (b) uniformly blending the PET and polycarbonate makes a composition of the polyethylene terephthalate and the polycarbonate containing the antiblock agent. Then (c) extruding the blended polyethylene terephthalate and polycarbonate containing antiblock agent at about 490° to about 530° F. forms a sheet. And the final step is (d) rapidly cooling the resulting extruded sheet with at least one cooling surface maintained at a surface temperature of about from 50° to about 160° F. for a period not exceeding about 15 seconds. The resulting sheet is essentially amorphous and nonoriented. The antiblock agent degrades the polycarbonate due to acidic hydrolysis and heat of extrusion compounding to make the concentrated masterbatch of antiblock agent in the polycarbonate, and the resulting final blend of polyethylene terephthalate and the masterbatch of polycarbonate is uniform. The resulting extruded sheet is clear. In order to extrude a sheet more suitable for thermoforming and filling with foods at high temperatures, such as between 150° and 180° F., the amount of polycarbonate added can be increased to about 40 percent by weight based on a final total weight of all components. The pH of the antiblock agent can be adjusted to below 6 prior to being added to the polycarbonate. Preferably, the antiblock agent inherently has a pH lower than 6, and is an amorphous silica prepared by the hydrolysis of silicon tetrachloride. Preferably the polycarbonate has an intrinsic viscosity of .5 or less after the compounding. The preferred particle size of the silica is between about 2 and about 6 microns; even more preferably, the average particle size of the silica is about 4 microns. The use of the preferred silica can be controlled to provide a sheet which has a haze value of less than about 5 percent and a "block" value of less than about 10 pounds measured as described in Example 2. The contact time for the cooling surface is preferably less than about 10 seconds; even more preferably in the range of about 0.04 to 10 seconds. Preferably, the polyethylene terephthalate has an intrinsic viscosity of from about 0.9 to about 1.2, and a melt viscosity at 525° F. of about 10,000 to 50,000 poises, and the polycarbonate is poly (4,4'-isopropylidene diphenyl carbonate). The blended composition of polyethylene terephthalate and polycarbonate is preferably dried to a water content of less than about 0.02 percent by weight prior to extrusion. The composition is preferably extruded onto at least two rotating cooling rolls maintained at a surface temperature of about 80° to 120° F. and rotating at substantially the same speed. Even more preferably, a pair of internally cooled chill rolls are employed to cool the freshly extruded sheet. In the most preferred embodiment, a stack of three chill rolls is employed to cool the freshly extruded sheet.

A container can be formed suitable for use in the filling of heated food by thermoforming the sheet extruded by this process at a temperature of about 210° to 280° F.

The product of this invention is a sheet suitable to be formed and filled with meats, pharmaceuticals, or heated food and the like. This sheet is essentially amorphous and nonoriented, and consists of from about 97.25 to 99.89 percent by weight of polyethylene terephthalate having an intrinsic viscosity of about 0.9, and a melt viscosity of 525° F. of above about 10,000 poises, and 2.5 to 0.1 percent by weight of a polycarbonate resin having an intrinsic viscosity of about 0.55 to 0.7 before and preferably about 0.5 or less after compounding with the antiblock agent and 0.25 to 0.01 percent by weight of an antiblock agent having a pH of below 6 before addition. This sheet results from extrusion of a uniform mixture of the polyethylene terephthalate and the masterbatch polycarbonate, with the antiblock agent being initially present only in the polycarbonate before addition to the polyethylene terephthalte. The antiblock agent is compounded, preferably extrusion compounded, with the polycarbonate so that the polycarbonate is degraded.

In order to form a sheet for use with higher temperature heated foods onto the thermoformed sheet, the sheet can have a polyethylene terephthalate content of from about 60 to 99.89 percent by weight and polycarbonate resin in an amount from about 39.75 to 0.1 percent by weight, with the same amount of antiblock agent. The preferred antiblock agent is amorphous silica prepared by the hydrolysis of silicon tetrachloride having a particle size of about 2 to 6 microns. Even more preferred is a particle size of about 4 microns. The preferred polycarbonate is poly (4,4'-isopropylidene diphenyl carbonate). The preferred polyethylene terephthalate has an intrinsic viscosity of about 0.9 to 1.2, and a melt viscosity at 525° F. of about 10,000 to 50,000 poises. The polycarbonate has a preferred intrinsic viscosity of from about 0.55 to about 0.7 prior to compounding with the antiblock agent.

Another aspect of this invention is a container thermoformed from the sheet described above. By proper control of the ingredients, the container thermoformed from this sheet can have a haze value of less than 5 percent and a block value of less than 10 pounds.

The final aspect of this invention is an improved masterbatch system. It is known to prepare polycarbonate containing silica by mixing for subsequent addition to polyethylene terephthalate. The improvement consists of uniformly extrusion compounding from about 5 to 50 percent by weight of the silica having a pH of less than 6 and a particle size of from about 2 to 6 microns with from about 95 to 50 percent by weight of the polycarbonate having an intrinsic viscosity of from about 0.55 to 0.7 so that the polycarbonate is degraded during the extrusion. Preferably, from about 10 to about 20 percent by weight of silica is added to from about 90 to 80 percent of polycarbonate, and the silica is an amorphous silica prepared by the hydrolysis of silicon tetrachloride. The preferred pH of the silica is about 5. Also, preferably, the intrinsic viscosity of the polycarbonate after blending is from about 0.4 to 0.5.

PREFERRED EMBODIMENTS

Our recent work with polycarbonates has shown that due to their high melt viscosity, they are good dispersing agents, and the higher the melt viscosity the better the obtained dispersion. Also, unlike high intrinsic viscosity PET, at one stage of the manufacturing process the material is in powder form and may be purchased as such.

We have also discovered two other facts which, in combination, present what we feel is a novel approach to preparing a concentrate for use with PET sheet. These facts are:

a. To make clear PET-polycarbonate blends, a low molecular weight polycarbonate is required.

b. A highly effective antiblock and slip additive having the trademark SYLOID 244 (amorphous silica made by W. R. Grace) is sufficiently acidic in nature to significantly degrade polycarbonates.

Using these newly discovered facts, the preferred embodiment of this invention is to take a high molecular weight polycarbonate in powder form, this being a high viscosity dispersing agent, and mix it with a quantity of silica of the correct particle size, average 4 microns, for antiblock properties. This silica should be of an acidic nature, around the pH of 5. The amount of silica will be on the order of 5 to 50 percent, but preferably 10 to 20 percent based on the weight of polycarbonate. This compound may be then processed on any single screw extruder to form a highly dispersed concentrate. However, during the extrusion stage, the acidic nature of the silica will cause sufficient degradation to lower the molecular weight of the polycarbonate to such a degree that it will mix readily with PET to give a clear sheet with excellent antiblock properties. The extent of the degradation may be controlled by the quantity and type of silica and the extrusion temperature.

The following examples illustrate the preferred embodiment.

EXAMPLE 1

A 2-inch extruder equipped with a mixing screw of the spiral dam type was used to extrude strands of polymer through a three-hole pelletizing die. The resulting strands were briefly immersed in water, then fed into a pelletizer. Two mixtures were prepared by drum tumbling 15 percent SYLOID 244 with a. polyethylene terephthalate of 0.95 intrinsic viscosity and b. polycarbonate of 0.57 intrinsic viscosity, both in powder form. These were then extruded into pellets.

Samples of concentrates (a) and (b) were then drum tumbled with polyethylene terephthalate to give a resulting concentration of 0.1 percent SYLOID 244, i.e., 149 parts of virgin pellet to 1 part of concentrate. These were then extruded into 5-mil sheets on a 1-inch extruder employing an 8-inch slit die. Very large numbers of undispersed particles of "fish-eyes" were observed in the case of (a), whereas in the case of (b) the sheet was of uniform clarity with no visible silica particles, demonstrating the superior dispersion of the polycarbonate concentrate.

EXAMPLE 2

A 10 percent SYLOID 244 masterbatch was prepared in polycarbonate powder of 0.57 intrinsic viscosity using the 2-inch extruder as described in Example 1. After pelletizing, the intrinsic viscosity of the polycarbonate was reduced to 0.45. Using an auger metering device, a blend of 1 percent concentrate and 99 percent virgin PET was prepared and extruded using a 3.5-inch extruder at a rate of 500 pounds per hour through a 47-inch sheet die. A 13-mil sheet of uniform clarity and excellent dispersion was produced with improved slip and block properties as shown below.

|  | Virgin PET | PET with 0.1 Percent SYLOID® 244 |
|---|---|---|
| Haze | 1% | 4% |
| Coefficient of Friction | 0.6 | 0.35 |
| Block Value, Pounds | 11.3 | 6 |

By "Block Value" is meant the force required to separate two preforms of a 16-cavity jelly cup mold initially pressed together under a 22-pound weight. By "Haze" is meant the haze value as determined by ASTM D-1003.

As used herein, the term "sheet" is intended to mean thin cast, extruded, or otherwise formed products which have a thickness up to about 50 mils or more and preferably about 5 to 25 mils and most preferably about 10 to 20 mils. As such, the term "sheet" includes "films" (i.e., structures having a thickness below 10 mils) and sheets (i.e, structures having a thickness above 10 mils) as both terms are used in the plastic film industry. The extrusion temperatures refer to the temperatures in the extruder die. Any suitable melt extrusion apparatus can be employed to extrude the sheet.

In addition to amorphous silica, diatomaceous earth, talc or magnesium silicate could be used as an antiblock agent. Other amorphous silicas could be used by adjusting the pH before addition by adding dilute acid or other known means.

We claim:

1. A method of adding an antiblock agent to polyethylene terephthalate, said polyethylene terephthalate having an intrinsic viscosity greater than 0.9, a melt viscosity at 525° F. of above about 10,000 poise, and used to form a sheet, consisting of
   a. compounding from about 0.25 to 0.01 percent by weight, based on the final total weight of all components, of said antiblock agent, said antiblock agent having a pH of less than 6, with from about 2.5 to 0.1 percent by weight, based on the final total weight of all components, of a degradable polycarbonate, said polycarbonate having an intrinsic viscosity of from about 0.55 to 0.7, before it is compounded, then
   b. uniformly blending said polyethylene terephthalate and said polycarbonate to make a composition of said polyethylene terephthalate and said polycarbonate containing said antiblock agent, then
   c. extruding said blended polyethylene terephthalate and polycarbonate containing antiblock agent at about 490° to 530° F. to form a sheet; and finally
   d. rapidly cooling the resulting extruded sheet with at least one cooling surface maintained at a surface temperature of from about 50° to about 160° F. for a period not exceeding about 15 seconds, said sheet being essentially amorphous and nonoriented, so that said antiblock agent degrades said polycarbonate due to heat and acid hydrolysis during compounding of said antiblock agent with said polycarbonate, whereby said blend of polyethylene terephthalate and polycarbonate is uniform and said extruded sheet is clear.

2. The method of claim 1 wherein said polycarbonate is added in an amount of from about 40 to 0.1 percent by weight based on the final total weight of all components.

3. The method of claim 1 wherein the pH of said antiblock agent is adjusted to below 6 prior to being added to said polycarbonate, and said compounding is extrusion compounding.

4. The method of claim 1 wherein said antiblock agent inherently has a pH lower than 6, and said compounding is extrusion compounding.

5. The method of claim 4 wherein said antiblock agent is an amorphous silica prepared by the hydrolysis of silicon tetrachloride, and said polycarbonate has an intrinsic viscosity of about 0.5 or less after said compounding.

6. The method of claim 5 wherein the particle size of said silica is between about 2 to about 6 microns.

7. The method of claim 6 wherein the average particle size of said silica is about 4 microns.

8. The method of claim 6 wherein said sheet has a haze value of less than about 5 percent and a block value of less than about 10 pounds.

9. The method of claim 1 wherein said contact time is less than about 10 seconds.

10. The method of claim 1 wherein said polyethylene terephthalate has an intrinsic viscosity of from about 0.9 to 1.2 and a melt viscosity at 525° F. of from about 10,000 to 50,000 poises, and said polycarbonate is poly(4,4'isopropylidene diphenylene carbonate).

11. The method of claim 1 wherein said blended composition is dried to a water content of less than about 0.02 percent by weight prior to extrusion.

12. The method of claim 1 wherein said composition is extruded onto at least two rotating cooling rolls maintained at a surface temperature of about 80° to 120° F. and rotating at substantially the same speed.

13. The method of claim 12 wherein a pair of internally cooled chill rolls are employed to cool said sheet.

14. The method of claim 12 wherein a stack of three chill rolls is employed to cool said sheet.

15. The method of claim 1 wherein said contact time is in the range of about 0.04 to 10 seconds.

16. The method of forming a container suitable for use in filling of heated foods which comprises thermoforming the sheet of claim 1 at a temperature of about 210° to 280° F. into said container.

17. A sheet containing an antiblock agent suitable to be formed and filled with meats, pharmaceuticals or heated foods and the like, said sheet being essentially amorphous and non-oriented, consisting of from about
- 97.25 percent to 99.89 percent by weight of polyethylene terephthalate having an intrinsic viscosity of above about 0.9 and a melt viscosity at 525° F. of above about 10,000 poises,
- 2.5 to 0.1 percent by weight of a polycarbonate resin having an intrinsic viscosity of about 0.55 to 0.7, before compounding with said antiblock agent,
- 0.25 to 0.01 percent by weight of an antiblock agent having a pH of below 6 before compounding, said sheet resulting from the extrusion of a uniform mixture of said polyethylene terephthalate and said polycarbonate, said antiblock agent being initially present in only said polycarbonate before addition to said polyethylene terephthalate, and said antiblock agent degrading said polycarbonate upon compounding therewith.

18. The sheet of claim 17 wherein said polyethylene terephthalate is present in an amount from about 60 to 99.89 percent by weight, and said polycarbonate resin is present in an amount from about 39.75 to 0.1 percent by weight.

19. The sheet of claim 17 wherein said antiblock agent is amorphous silica prepared by the hydrolysis of silicon tetrachloride.

20. The sheet of claim 19 wherein the particle size of said silica is about 2 to 6 microns.

21. The sheet of claim 20 wherein the average particle size is about 4 microns.

22. The sheet of claim 17 wherein said polycarbonate is poly(4,4'- isopropylidene diphenylene carbonate).

23. The sheet of claim 17 wherein said polyethylene terephthalate has an intrinsic viscosity of about 0.9 to 1.2 and a melt viscosity at 525° F. of from about 10,000 to 50,000 poises.

24. The sheet of claim 17 wherein said polycarbonate has an intrinsic viscosity of from about 0.55 to about 0.7, before extrusion compounding, and less than about 0.5 after the compounding.

25. The container thermoformed from the sheet of claim 17.

26. The container of claim 25 having a haze value less than 5 percent and a block value of less than 10 pounds.

27. In a method for preparing a masterbatch of polycarbonate containing silica for subsequent addition to polyethylene terephthalate comprising mixing said silica with said polycarbonate, the improvement consisting of
- uniformly compounding from about 5 to 50 percent by weight of said silica having a pH of less than 6 and a particle size of from about 2 to 6 microns with from about 95 to 50 percent by weight of said polycarbonate having an intrinsic viscosity of from about 0.55 to 0.7, before compounding, so that said polycarbonate is degraded during said compounding.

28. The method of claim 27 wherein from about 10 to about 20 percent by weight of silica is added to from about 90 to 80 percent by weight of polycarbonate.

29. The method of claim 28 wherein said silica is an amorphous silica prepared by the hydrolysis of silicon tetrachloride, and said compounding is extrusion compounding.

30. The method of claim 29 wherein said silica has a pH of about 5.

31. The method of claim 27 wherein the intrinsic viscosity of said polycarbonate after said compounding is from about 0.4 to 0.5.

* * * * *